Inventors
Warren B. Harnden
Eugene H. Marill
By
McCanna, Morsbach, Pillote & Muir
Attorneys

United States Patent Office 3,726,780
Patented Apr. 10, 1973

3,726,780
ELECTROFLOTATION APPARATUS
Warren B. Harnden and Eugene H. Morrill, Rockford, Ill., assignors to Illinois National Bank & Trust Company, Rockford, Ill., as trustee
Filed May 14, 1971, Ser. No. 143,305
Int. Cl. B01k 3/00
U.S. Cl. 204—275                                      20 Claims

ABSTRACT OF THE DISCLOSURE

A tank, having a height several times its effective diameter, has a plurality of horizontal electrodes disposed throughout its entire height. Conduits and controls are provided for downflow of liquid to be purified in a non-turbulent manner. Electrolysis of the liquid causes gas bubbles to flow upwardly. This apparatus creates a non-turbulent flow of liquid directly counter to the flow of gas bubbles for a substantial vertical distance. In one embodiment the tank is a cylinder, while in another it has downwardly converging sides.

BACKGROUND

The invention pertains generally to liquid purification and more particularly to apparatus for liquid purification by electroflotation.

Flotation equipment has been used to separate liquid from suspended solids or immiscible liquid in suspension. Electrolytic equipment has been used to produce a rising flow of gas bubbles for flotation but at least some of this equipment has been expensive to operate.

Known electrolytic flotation tanks do not achieve maximum efficiency from the rising current of gas bubbles. One such tank has a rectangular configuration and liquid flows horizontally through the tank while rising bubbles lift impurities to the surface. In such a tank there is unequal loading on the electrodes between the point where liquid is introduced and where effluent is removed.

U.S. Pat. 3,479,281, issued Nov. 18, 1969, to Kikindai et al. has a single pair of foraminous electrodes for generating gas bubbles and a turbulent zone above it for uniform distribution of the suspended phase throughout the mass of liquid. It has been discovered that it is desirable to eliminate any turbulence. U.S. Pat. 3,552,571; issued Jan. 5, 1971, to Neuspiel et al. discloses an improvement which includes a rotating distributor arm above the electrodes, and a rotating effluent collection arm below the electrodes. It is desirable to have a more efficient, yet simplified, electroflotation apparatus.

SUMMARY

The present invention relates to apparatus for the purification of liquid by electroflotation.

It is a general object of the invention to provide an electroflotation apparatus which is more efficient and simplified than prior apparatus.

Another object is to provide an electroflotation apparatus which eliminates any turbulence.

Still another object is to provide an electroflotation apparatus which creates a non-turbulent flow of liquid directly counter to the flow of gas bubbles for a substantial vertical distance.

Another object of the invention is to provide an electroflotation apparatus which has a greater area of negative electrodes than positive electrodes.

Yet another object is to provide a new and improved electroflotation apparatus having horizontally disposed electrodes spaced throughout at least the major portion of the height of the tank.

These, and other objects and advantages of the present invention, will become apparent as the same become better understood from the following detailed description when taken in conjunction with the accompanying drawings.

DRAWINGS

Figure 1:
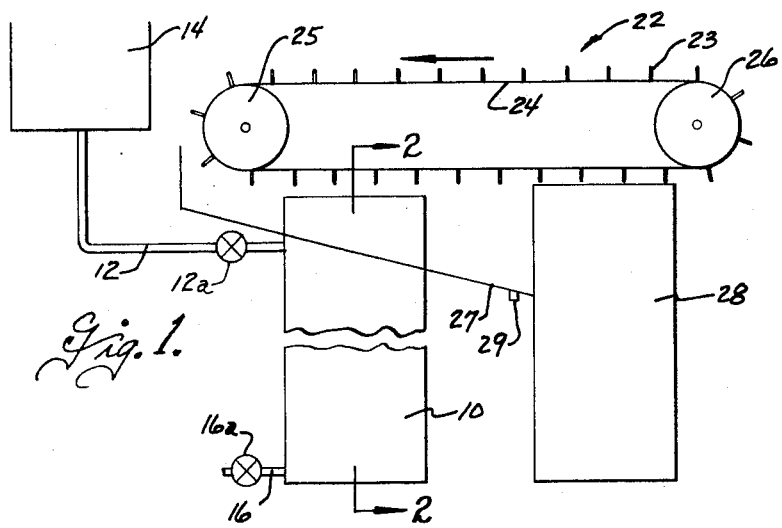
Figure 2:
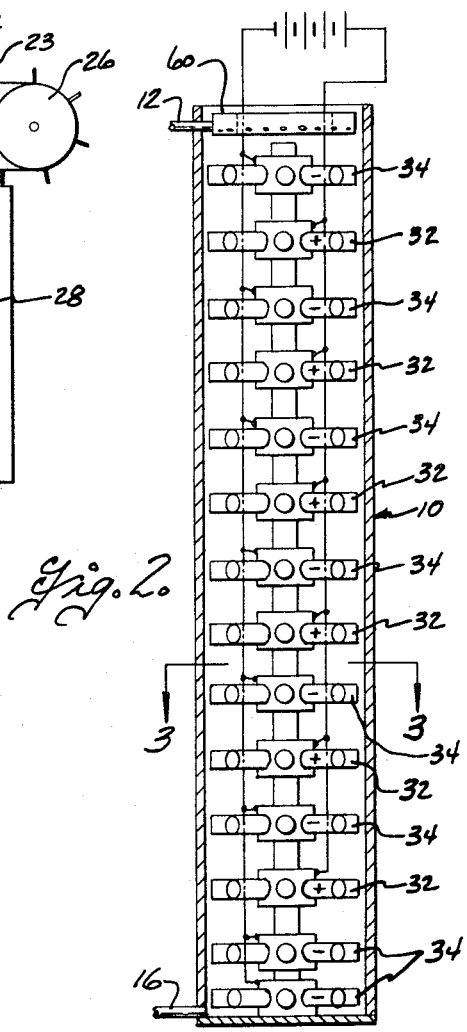
Figure 4:
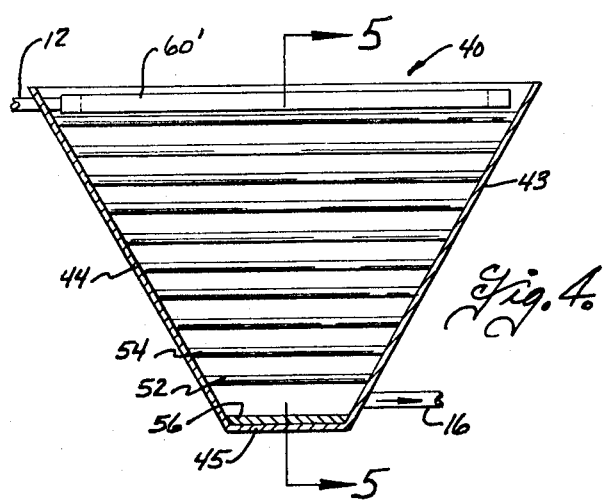
Figure 5:
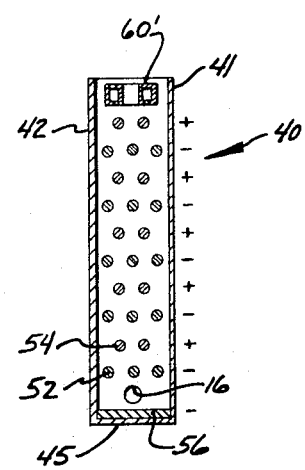
Figure 3:
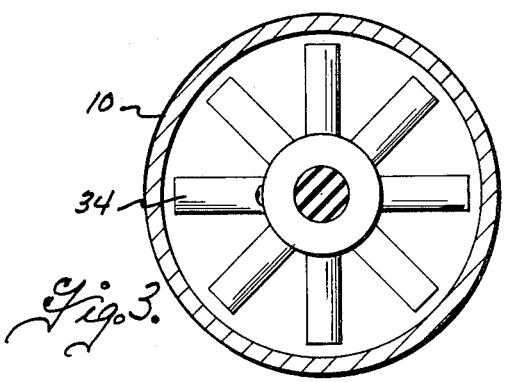

FIG. 1 is a diagrammatic view of an electroflotation apparatus embodying the present invention;
FIG. 2 is a vertical sectional view taken generally along line 2—2 of FIG. 1;
FIG. 3 is a horiozntal sectional view taken along line 3—3 of FIG. 2;
FIG. 4 is a longitudinal sectional view of another embodiment of the invention; and
FIG. 5 is a cross-sectional view taken along line 5—5 of FIG. 4.

DESCRIPTION

Reference is now made more particularly to the drawings which illustrate the best presently known mode of carrying out the invention and wherein similar reference characters indicate the same parts throughout the several views.

In general, the apparatus diagrammatically illustrated in FIG. 1 includes an electrofloatation tank 10 which is open at the top and has an influent conduit 12 which admits liquid to be treated from a reservoir 14 into the top of the tank. An effluent conduit 16 withdraws purified liquid from the bottom of the tank. Valves 12a and 16a, associated with conduits 12 and 16, respectively, control the flow through the tank 10 at a rate so that there is no turbulence in the tank. Preferably, the tank 10 has a height several times its diameter for a reason hereafter explained.

Any floc which rises to the top of the tank 10 is removed from the surface by a conveyor generally designated 22. While the floc may be removed by any acceptable means, the conveyor 22 is shown as having a plurality of paddles 23 mounted on a continuous band 24 which travels around driven rollers 25 and 26. A trough 27 receives the discharge floc and transports it to a receiving tank 28 or dispenses it through an outlet 29.

In the embodiment of FIG. 2, the tank 10 is in the form of a right cylinder having a circular cross-section and with a height to diameter ratio of about 5 to 1. While other shapes are contemplated, it is preferable that the tank have a height of at least twice its effective diameter so that the flow therethrough is assured to be directly counter to the flow of the rising gas bubbles. The term "effective diameter" means the average width of the tank 10. A shallow tank having a height to effective diameter ratio of about 1 to 1 does not assure this desirable counterflow. The tank, having a height of at least twice, and preferably several times its effective diameter, aids in assuring the nonturbulent flow mentioned above.

A plurality of positive electrodes 32 and a plurality of negative electrodes 34 are disposed horizontally in the tank 10. As an example of suitable materials, the negative electrodes 34 are made of carbon and the positive electrodes 32 are made of "Duriron." Preferably, these electrodes are vertically spaced from each other along at least a major portion of the height of the tank and, advantageously, the full height of the tank, as shown in FIG. 2. It has been found preferable that there be a greater number of negative electrodes 34 than positive electrodes 32, as shown, and that there be a concentration of negative electrodes adjacent the bottom of the tank 10. This assures that there is a large negative polar charge adjacent the bottom, without any gas bubbles being formed thereat, to repel the negatively charged floc. This negative charge provides a quiescent zone which acts as a buffer to prevent any floc from being discharged through the effluent line 16.

Milk water waste, oily waste water, and dye plant waste have been effectively treated with the above apparatus. Various coagulants are added depending on the type of waste. Typical coagulants include aluminum sulfate, ferric chloride, lime, hydro sodium sulfate, and poly electrolytes such as "Nacolyte 607" sold by Nalco Chemical Company. In treating mail water waste, for example, it has been possible to easily obtain a treatment of two times the capacity of the tank per hour and up to four times the capacity.

In the embodiment shown in FIGS. 4 and 5, there is a generally V-shaped tank 40 which has vertical side walls 41 and 42 and downwardly converging side walls 43 and 44. The tank 40 is open at the top and has a substantially smaller bottom 45. This shape has been found preferable since the majority of the treatment occurs adjacent the top of the tank. In this manner, the volume of the tank can be reduced without reducing its height. To put it another way, the height to effective diameter ratio is increased without reducing the area of the top and without reducing the height. The same result can be achieved with a pyramidal shaped or frustoconical shaped tank. Again, it is preferable to have more negative electrodes 52 than positive electrodes 54. Their areas are preferably in a ratio of about 3 to 2. Another feature of this embodiment is that it has a negatively charged plate 56 covering substantially the entire bottom of the tank. Again, this is to assure a large nagative polar charge adjacent the effluent line 16 so as to prevent any floc from being withdrawn therethrough. Thus, including the area of the charged plate, the area of the negative electrodes is greater than one and one-half times the area of the positive electrodes.

It has been previously indicated that the flow through tank 10 or 40 is preferably non-turbulent throughout and that the height to effective diameter ratio cooperates to this end. As another feature to this end, an influent distributor 60 or 60' is attached to the influent conduit 12 of tanks 10 and 40, respectively. The distributor is shaped to compliment the tank; distributor 60 being a circular tube, while distributor 60' is a rectangular tube. The distributor preferably spreads the influent liquid evenly over the top of the tank; but leaves enough open space for easy passage of the floc upwardly.

It is now deemed obvious that the above-described apparatus provides a new and useful electroflotation apparatus in which the tank has a height several times its effective diameter to cooperate with controls to provide a non-turbulent flow of liquid through the tank directly counter to the flow of the gas bubbles for a substantial vertical distance. The tank also has a multiplicity of horizontally disposed electrodes spaced vertically in the tank along at least a major portion of the height thereof and advantageously throughout its entire height. The electrodes are arranged to provide a negatively charged zone adjacent the bottom of the tank.

While preferred embodiments of the invention have herein been illustrated and described, this has been done by way of illustration and not limitation, and the invention should not be limited except as required by the scope of the appended claims.

The embodiments of the invention in which an exclusive property or privilege is claimed are defined as follows:

1. An apparatus for the purification of liquid by electroflotation comprising: a tank having a height at least twice its effective diameter; a plurality of electrodes disposed horizontally in the tank between the top and bottom thereof to produce an upward flow of gas bubbles by electrolysis of the liquid treated; said electrodes including a multiplicity of cathodes and anodes alternately and vertically spaced in the tank along at least a major portion of the height thereof; first conduit means at the top of the tank for introducing liquid to be purified in a non-turbulent manner; second conduit means at the bottom of the tank for withdrawing purified liquid from the tank; and means for controlling the downflow of liquid through the tank so that the downflow is at a velocity less than that of the rising bubbles; whereby the height to diameter ratio of the tank creates a non-turbulent flow of liquid directly counter to the flow of the gas bubbles for a substantial vertical distance.

2. An apparatus for the purification of liquid by electroflotation as set forth in claim 1 wherein the area of the cathodes is greater than that of the anodes.

3. An apparatus for the purification of liquid by electroflotation as set forth in claim 1, there being a greater area of cathodes adjacent the bottom of the tank than the area of anodes located at a level immediately thereabove to provide a negatively charged zone adjacent the second conduit means.

4. An apparatus for the purification of liquid by electroflotation as set forth in claim 3 wherein the tank is an upright cylinder; the horizontally disposed electrodes are vertically spaced in the tank along substantially the full height thereof; and including means at the top of the tank for removing floc from the surface of the liquid in the tank.

5. An apparatus for the purification of liquid by electroflotation as set forth in claim 1 wherein the tank has a height about five times its effective diameter.

6. An apparatus for the purification of liquid by electroflotation comprising: a tank, a multiplicity of horizontally disposed electrodes spaced vertically in the tank along at least a major portion of the height thereof; the electrodes including cathodes and anodes connected to a source of direct current to produce an upward flow of gas bubbles; the total area of the cathodes being greater than the total area of the anodes; first conduit means at the top of the tank for introducing liquid to be purified; second conduit means at the bottom of the tank for withdrawing purified liquid from the tank; means for controlling the flow of liquid downwardly through the tank in a non-turbulent manner; whereby the upward flow of gas bubbles is counter to the downward flow of liquid.

7. The combination of claim 6 wherein the area of the cathodes to anodes is about 3 to 2.

8. The combination of claim 6 wherein the electrodes are vertically spaced in the tank along substantially the full height thereof.

9. The combination of claim 8 wherein the tank is cylindrical in shape and has a height about five times its effective diameter.

10. The combination of claim 8 wherein the sides of the tank converge from the top toward the bottom.

11. Apparatus according to claim 8 wherein the area of cathodes is about at least one and one-half times the area of anodes.

12. Apparatus according to claim 11 wherein generally the entire bottom of the tank is a negative electrode.

13. Electroflotation apparatus for purification of liquids, comprising
   (a) a tank having a bottom end and a top end,
   (b) supply means adjacent the top end of the tank for the introduction of liquid to be purified and for distributing said liquid over the cross-sectional area of the tank,
   (c) discharge means adjacent the bottom end of the tank for withdrawal of purified liquid from the tank,
   (d) a plurality of electrodes disposed substantially horizontally one above the other in the tank and connected with a source of electricity to produce an upwardly flow of gas bubbles by electrolysis of the liquid flowing downwardly through the tank,
   (e) control means connected with said source of electricity to regulate the electrical characteristics of the current supplied to said electrodes to thereby control the size, number and velocity of said gas bubbles, (f) the total negative electrode area being greater than the total positive electrode area in the tank, and there being a concentration of negative electrode area adjacent the bottom end of the tank to thereby provide a negatively charged zone adjacent said discharge means, and (g) means at the top end of the tank for removing floc from the surface of the liquid in the tank.

14. Electroflotation apparatus for the purification of liquid as set forth in claim 13 wherein the negative electrode area is greater than that of the positive electrode area.

15. Electroflotation apparatus for the purification of liquid as set forth in claim 13 wherein the plurality of electrodes disposed horizontally in the tank comprises a multiplicity of horizontally disposed electrodes vertically spaced in the tank along at least a major portion of the height thereof.

16. Electroflotation apparatus for the purification of liquid as set forth in claim 15 wherein the tank is an upright cylinder; and the plurality of electrodes comprises a multiplicity of horizontally disposed electrodes spaced vertically in the tank along substantially the full height thereof.

17. Electroflotation apparatus for the purification of liquid as set forth in claim 13 wherein the tank has a height about five times its effective diameter.

18. Electroflotation apparatus for the purification of liquid as set forth in claim 13, wherein the bottom side of each electrode is devoid of flat and concave surface portions which would be apt to retain ascending gas bubbles.

19. Electroflotation apparatus for the purification of liquid as set forth in claim 13, wherein the electrodes at one level in the tank are disposed in horizontally staggered relation to the electrodes at an adjacent level to force the gas bubbles to follow curving paths in their ascending movement through the tank.

20. Electroflotation apparatus for purification of liquids, comprising (a) a tank having a bottom end and a top end, (b) a supply means adjacent the top end of the tank for the introduction of liquid to be purified and for distributing said liquid over the cross-sectional area of the tank, (c) discharge means adjacent the bottom end of the tank for the withdrawal of purified liquid from the tank, (d) a plurality of electrodes disposed substantially horizontally one above the other in the tank and connected with a source of electricity to produce an upwardly flow of gas bubbles by electrolysis of the liquid flowing downwardly through the tank.

(e) the total negative electrode area being greater than the total positive electrode area in the tank, and there being a concentration of negative electrode area adjacent the bottom end of the tank to thereby provide a negatively charged zone adjacent said discharge means, and (f) means associated with the supply and discharge means for controlling the flow of liquid downwardly through the tank in a non-turbulent manner, counter to the upwardly flow of gas bubbles, and at a velocity less than that of the rising bubbles.

References Cited

UNITED STATES PATENTS

| 2,695,710 | 11/1954 | Gibbs | 210—44 |
| 3,586,627 | 6/1971 | Gooch | 204—149 |
| 3,479,281 | 11/1969 | Kikindai et al. | 204—149 |

FOREIGN PATENTS

| 676,854 | 8/1952 | Great Britain | 204—186 |

JOHN H. MACK, Primary Examiner

W. I. SOLOMON, Assistant Examiner

U.S. Cl. X.R.

204—149; 210—44, 221